Sept. 13, 1966     W. R. LEOPOLD, JR., ETAL     3,272,009
BY-PASS TYPE METER SETTING
Filed Dec. 17, 1963     3 Sheets-Sheet 1
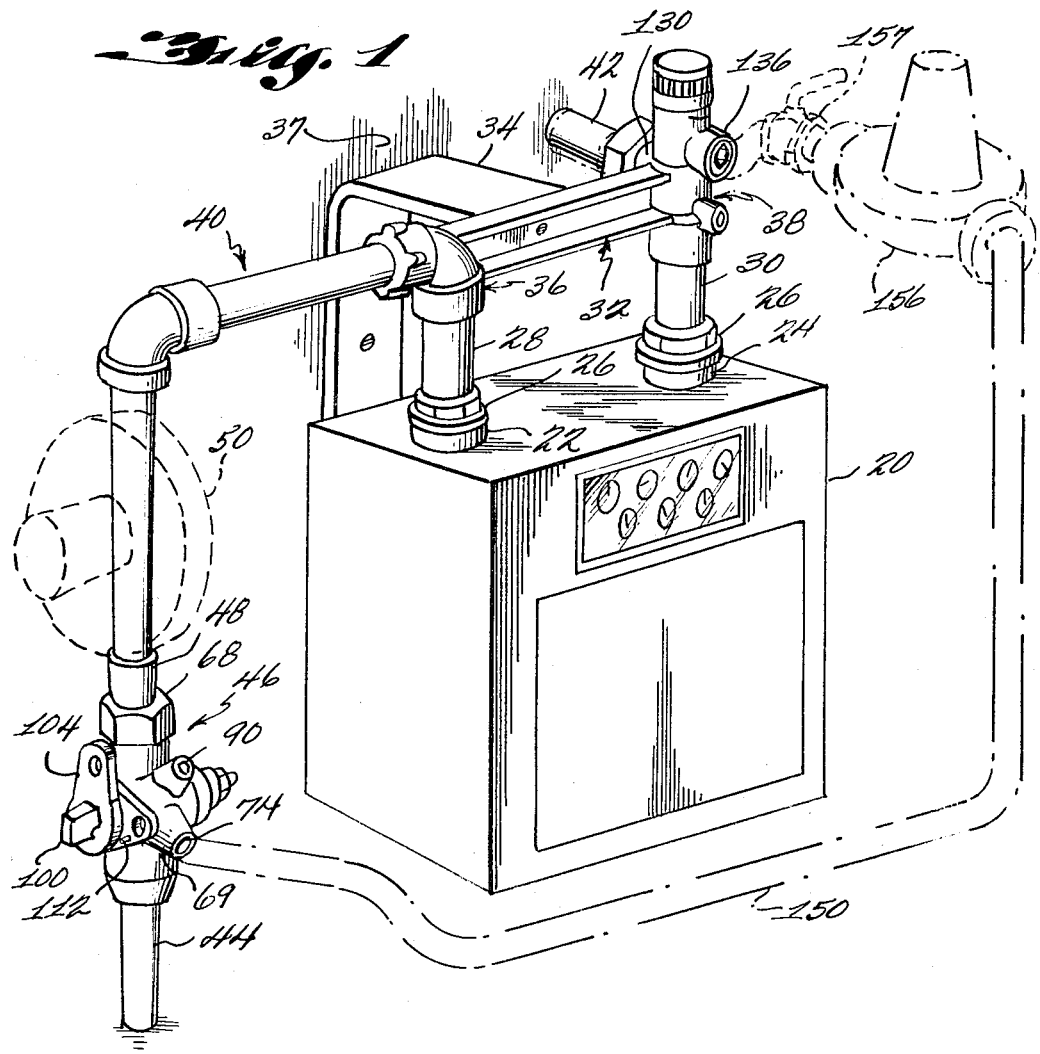
INVENTORS
WILBUR R. LEOPOLD, JR.
JOHN J. SMITH
BY Cushman, Darby & Cushman
ATTORNEYS

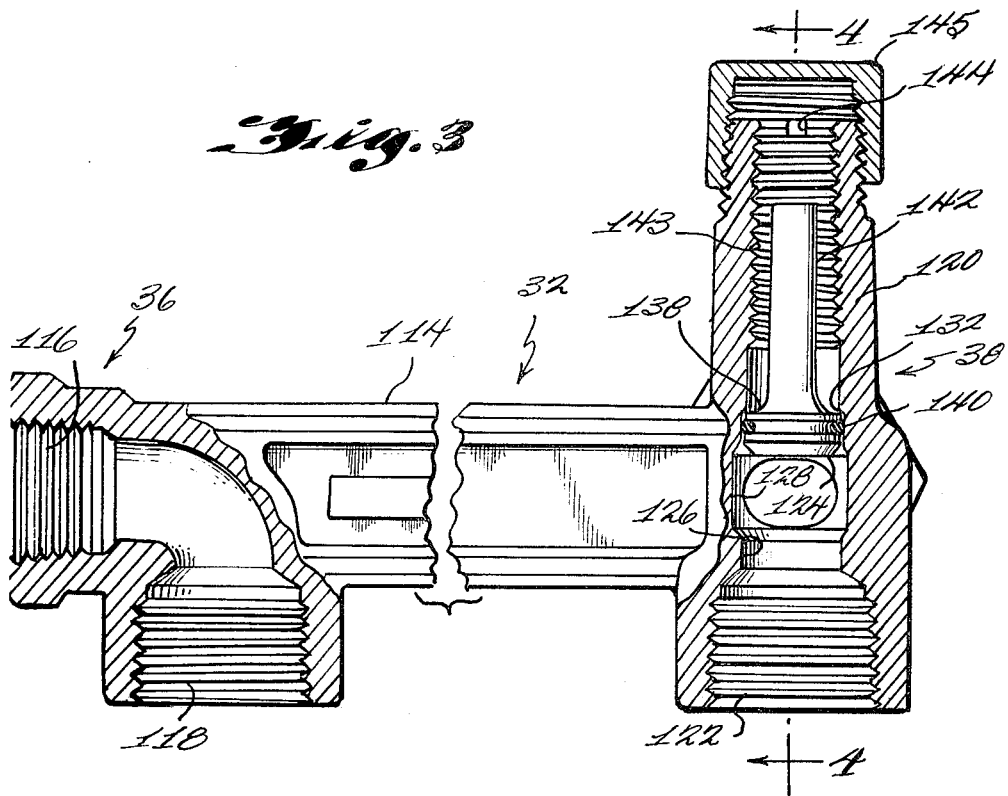
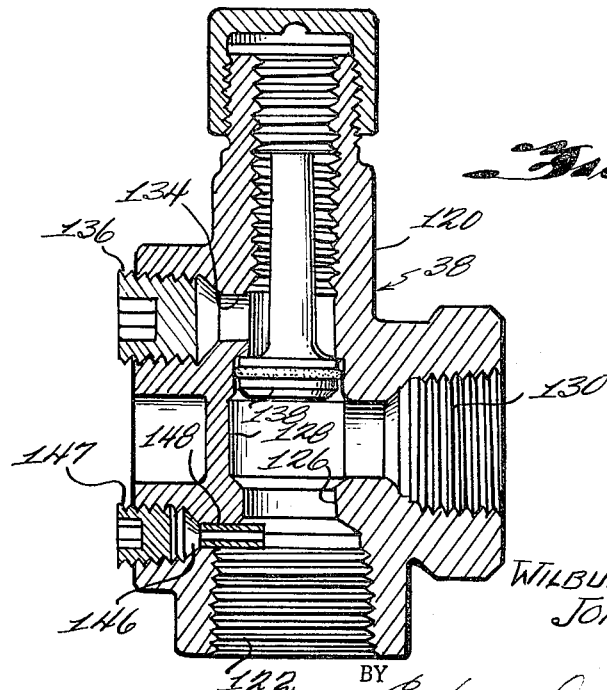

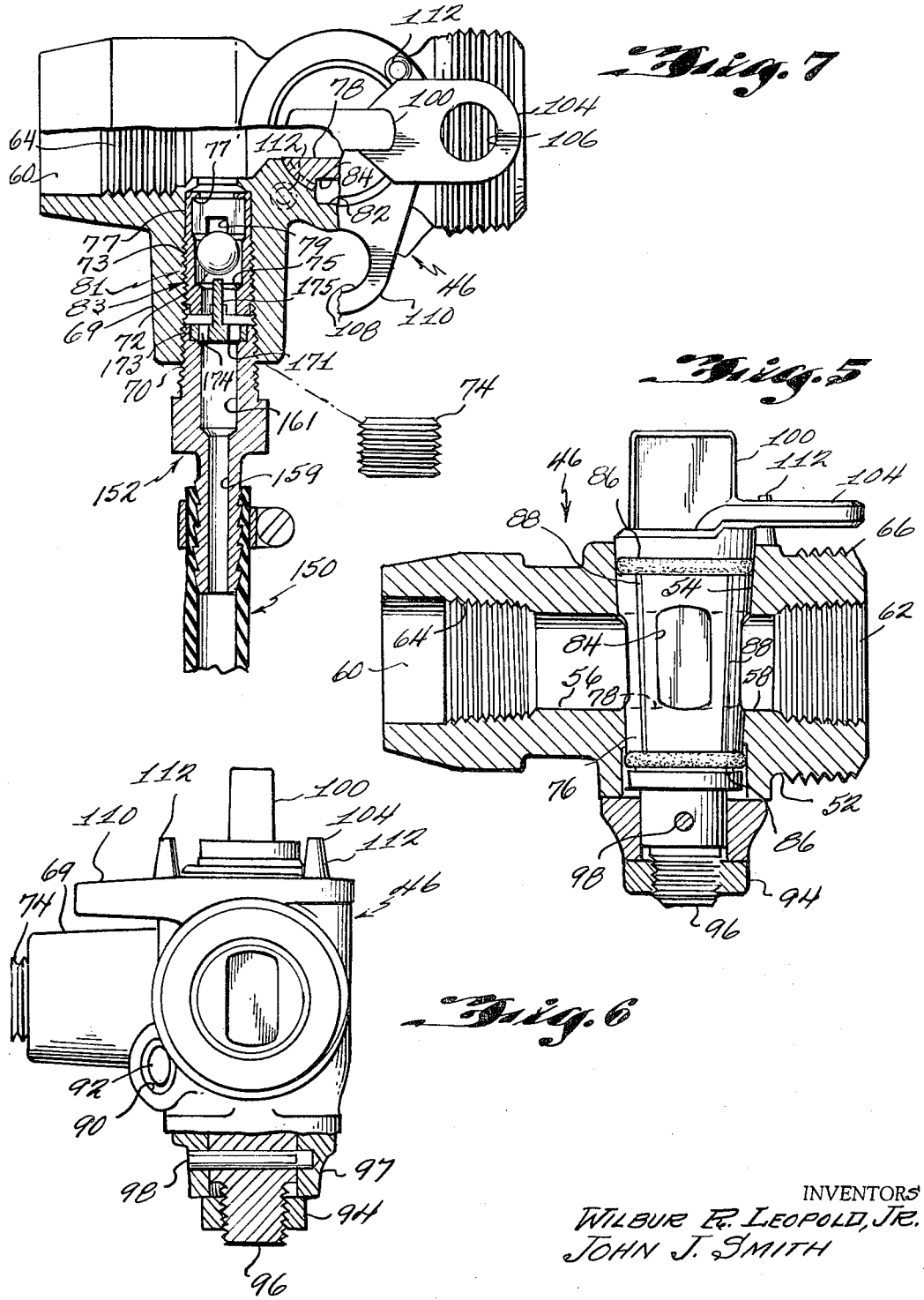

United States Patent Office 3,272,009
Patented Sept. 13, 1966

3,272,009
BY-PASS TYPE METER SETTING
Wilbur R. Leopold, Jr., and John J. Smith, Decatur, Ill., assignors to Mueller Co., Decatur, Ill., a corporation of Illinois
Filed Dec. 17, 1963, Ser. No. 331,213
12 Claims. (Cl. 73—201)

The present invention relates to a by-pass type meter installation or setting and more particularly to an improved arrangement wherein a fluid meter can be removed from a fluid service line, such as a gas line, without interrupting service. Ancillary, the invention relates to an improved type of meter bar for detachably supporting and connecting a fluid meter in a fluid service line.

It is an established practice among many gas utility companies to remove, inspect, clean, repair and replace their gas meters after the latter have been in service for a period of time. Where the meter is a residential gas meter, difficulty is presented to its removal and replacement, in that any stoppage of gas flow will cause pilot lights to be extinguished in gas operated appliances, such as stoves, refrigerators, hot water heaters, etc. When service is then restored, there is a possibility that the relighting of one or more pilot lights will be forgotten, putting the residence in a dangerous condition. Even if the gas flow is not stopped during the meter replacement, a sudden surge of gas, if permitted, blows out the pilot lights.

Various prior attempts have been made to provide a system for replacing fluid service meters. These prior systems fall short in that they cause the interruption of fluid service or a fluid surge at some time during the replacement, require a number of expensive special parts, are too cumbersome and difficult to operate, or are of such inflexibility that they will not fit and therefore cannot be employed in confined areas.

It is, therefore, an object of the present invention to provide an improved by-pass type meter setting in which a fluid meter can be removed from a fluid service line without interrupting service.

It is another object of the present invention to provide an improved by-pass type meter setting wherein a fluid meter can be removed from a fluid service line and replaced with the same or a separate meter without interruption of service and without causing a fluid surge in the line.

Yet another object of the present invention is to provide a by-pass type meter setting which can be employed in confined areas.

A further object of the present invention is to provide a by-pass type meter setting that can be operated by persons of limited skill with a minimum of instruction.

It is another object of the present invention to provide a by-pass type meter setting that can be operated without using special tools.

It is another object of the present invention to provide a by-pass type meter setting that is substantially tamper-proof.

Yet another object of the present invention is to provide a by-pass type meter setting that is simple in construction with resulting economies of manufacture and installation.

It is a further object of this invention to provide an improved meter stop that can be used for by-passing purposes.

Another object of the present invention is to provide an improved meter stop for use in by-passing purposes, the meter stop having only two positions for its valve, namely to stop flow to the meter and to permit flow to the meter, the meter stop being provided with means upstream of the valve for by-passing the valve upon connecting a by-pass line thereto and to a position downstream of the meter.

Ancillary to the preceding object, it is a further object of the present invention to provide a meter stop in which there can be no inadvertent operation permitting escape of fluid to the atmosphere during maintenance on a meter.

Still a further object of the present invention is to provide an improved type of meter bar which enables connection of the service line to the meter and the supply line to the meter without the provision of additional elbows or the like, especially when the service line for a dwelling or the like extends perpendicular from a wall.

These and other objects and advantages of the present invention will be more clearly understood from the following detailed specification, claims, and drawings in which:

FIGURE 1 is a perspective view of a meter setting embodying the present invention;

FIGURE 2 is a side elevational view of the by-pass line shown in dotted lines in FIGURE 1, the pressure regulator being omitted therefrom;

FIGURE 3 is a vertical sectional view, partly in elevation, of the improved meter bar of the present invention illustrated in FIGURE 1;

FIGURE 4 is a sectional view taken on the line 4—4 of FIGURE 3;

FIGURE 5 is a vertical section view of the meter stop illustrated in FIGURE 1, the valve plug being shown in elevation;

FIGURE 6 is an end view of the stop shown in FIGURE 5 and taken from the right-hand end of the latter; and FIGURE 7 is a top view of the stop shown in FIGURE 5 with fragmentary portions broken away and with the end of the by-pass line connected thereto.

Referring now to FIGURE 1 of the drawings, a conventional gas meter 20 has an inlet conduit 22 and an outlet conduit 24 projecting therefrom. The inlet conduit 22 and the outlet conduit 24 are spaced from each other and substantially parallel to each other and are secured as by unions 26 to nipples 28 and 30, respectively, for suspending the meter from a meter bar 32. The meter bar 32 is provided with a bracket 34 fixedly connected thereto, the bracket enabling the meter bar to be supported to a vertical wall indicated at 37. The meter bar 32 embodies an integral inlet fitting 36 in the form of an elbow and an integral outlet fitting 38 which will be described more fully later in the specification. A gas supply line generally indicated at 40 and extending from a source of supply (not shown) is connected to the inlet fitting 36 of the meter bar 32 whereas a service line 42 extending perpendicularly from the wall 37 is connected directly to the outlet fitting 38, the service line supplying gas to the house piping (not shown).

The gas supply line 40 includes a conventional riser pipe 44 into which is connected an improved meter stop or rotary plug valve 46 embodying the present invention. The rotary plug valve 46 is similar to the one disclosed in United States patent to Mueller, No. 2,653,791. Preferably, the stop 46 is connected to the downstream side of the line 40 by an insulated coupling 48 of the type disclosed in greater detail in the copending application of Bowan et al. Ser. No. 860,303, now Patent No. 3,115,354. If gas is supplied to the supply line 40 under high pressure, such pressure must be lowered before it enters a residence or a commercial building. For this purpose, a conventional pressure regulator or reducing valve 50, shown in dotted lines, can be connected into the supply line between the meter stop 46 and the meter bar 32.

The meter stop 46 is best shown in FIGURES 5, 6, and 7 and is a modification of the lubricating meter stop disclosed in the aforementioned U.S. Patent No. 2,653,791, as well as that shown in the copending United States application of Mueller, Ser. No. 229,704, now U.S. Patent No. 3,187,570. The stop 46 includes a body 52 provided with a tapered valve seat 54 having diametrically aligned inlet and outlet ports 56 and 58 communicating, respectively, with aligned inlet and outlet passageways 60 and 62. The inlet passageway 60 may be provided with interior threads 64 for connection to the upstream end of the riser pipe 44, while the valve body 52 may be provided with exterior threads 66 for engagement by a coupling nut 68 (FIGURE 1) to connect the outlet passageway 62 with the downstream side of the supply line 40 by the insulated coupling 48 of the type described in more detail in the aforementioned application of Bowan et al.

As best shown in FIGURES 1 and 7, the body 52 of the stop 46 is provided with a boss 69 upstream of the valve seat 54. The boss 69 is provided with a by-pass port 70 which communicates directly by a by-pass passageway 72 in the boss 69 of body 52 with the inlet passageway 60. The outer end of the passageway 72 is normally closed by an exteriorly threaded closure plug 74 when the by-pass passageway is not being used.

It will be noted that a fitting 73 is also exteriorly threaded and threadedly received in the passageway 72, the fitting 73 being provided with an interior annular valve seat 75. The fitting 73 has an annular sleeve like end portion 77 with an inturned flange 77′ extending in the passageway 72 adjacent the area where the passageway 72 communicates with the inlet passage 60. The end portion 77 retains a horseshoe magnet 79 in place in the passageway 72, the magnet 79 normally retaining a steel ball type valve member 81 carried within the tubular fitting 73. The ball type valve member 81 and the valve seat 75 provides a one way check valve generally designated at 83 to prevent escape of fluid to atmosphere when the closure plug 74 is moved from the boss 69, for example, an excessive flow safety valve type in which the rush of gas past the ball type valve member 81 causes the ball to move outwardly off of the magnet 79 onto the seat 75 to prevent the escape of fluid to atmosphere. The co-operation of the excessive flow safety valve 83 with a by-pass line 150 will be explained in more detail later in the specification.

Rotatably mounted in the interior valve seat 54 is a tapered key or valve plug 76 provided with a diametric passageway 78 shown in broken lines in FIGURE 5 and alignable with the inlet and outlet seat ports 56 and 58 in the open position of the valve 46 in order to permit flow to then pass through the inlet and outlet passageways 60 and 62 to the meter 20. The plug 76 is also provided with a false port 84 which registers with a false port 82 in the valve seat 54. The purpose of the false ports 82 and 84 is to eliminate seat and valve plug sealing surfaces that would be exposed to line fluids with the resulting possible corrosion of such surfaces in the operation of the valve or stop 46.

It will be obvious that when the valve plug 76 is turned 90° from the position shown in FIGURE 5 or 7, the valve 46 will be in a closed position as the passageway 78 will be out of alignment with the passageways 60 and 62. When in this position, there can be no flow to the meter 20.

As disclosed in greater detail in the aforementioned Mueller Patent No. 2,653,791, the valve plug 76 is preferably provided adjacent its larger and smaller ends with circumferential grooves within which are disposed resilient pressure deformable packing rings 86 illustrated in the drawings as being in the form of O-rings which provide an effective seal between the valve plug and the valve seat 54 adjacent the opposite ends of the latter. Longitudinal lubricant channels 88 in the plug 76 extend between and connect the O-ring grooves so as to form therewith a closed lubricant system. Lubricant can be introduced into the system through a radial charging port 90 (FIGURE 6) in the body 52 which registers with one of the longitudinal channels 88 in the valve plug 76 in the open or closed positions of the latter. The outer end of the charging port 90 is enlarged and interiorly threaded for reception of an exteriorly threaded closure plug 92.

The valve plug 76 is retained in its seat 54 by a nut 94 (FIGURES 5 and 6) engaged with a reduced threaded extension 96 on the smaller end of the plug and bearing against a washer 97 that, in turn, bears against an annular bearing surface on the body 52 and the smaller end of the valve seat 54. Preferably, the washer 97 is locked to the plug 76 by a retaining pin 98 which extends through one side of the washer, through the extension 96 on the small end of the plug, and into a blind socket in the other side of the washer, in order to render the valve 46 substantially tamper-proof, all as disclosed in greater detail in the aforementioned Mueller patent.

The larger end of the plug 76 is provided with a substantially flat wrench-engageable extension 100 for rotating the plug between the open and closed positions, such extension being aligned with the diametric passageway 78 in the plug so as to provide an exterior indicaton of the position of such passageway. The larger end of the plug 76 is also provided with a radial lock-wing 104 having an aperture 106 therethrough alignable with a corresponding aperture 108 in a fixed lock-wing 110 on the body 52 in the closed position of the valve so as to permit the insertion of a locking device such as a padlock (not shown) through both such apertures in order to lock the valve 46 in its closed position. The valve body 52 can also be provided with projections 112 that serve as a stop to limit rotary movement in the open and closed positions.

As best shown in FIGURES 1, 3, and 4, the meter bar 32 of the present invention comprises a rail-like center portion 114 having at its opposite ends thereof and integral therewith the inlet and outlet fittings 36 and 38. As mentioned above, the inlet fitting 36 simply is in the nature of an elbow having an interiorly threaded inlet 116 and an interiorly threaded outlet 118 for connection with the downstream end of the supply line 40 and the nipple 28, respectively. The outlet fitting 38 is somewhat in the nature of a spool valve having a body 120 provided at its lower end with an interiorly threaded inlet 122 for connection therein of the nipple 30 leading to the outlet 24 of the meter 20. The body 120 also is provided with a through bore aligned with the inlet 122 and having upper and lower cylindrical sections 124 and 126 of the same uniform diameter, separated by an enlarged bore section 128. Communicating with the boss section 128 is a lateral outlet 130 having an enlarged and interiorly threaded outlet end for connection to the service line 42 leading to the house piping.

It is important to note that the lateral outlet 130 has an axis which is normal or at right angles to the axis of the inlet 122 as well as normal or at right angles to the axis of the center portion of the rail-like center portion 114. Thus, when the meter bar 32 is attached to the nipples 28 and 30 of the meter 20, the service pipe 42 extending perpendicularly from the wall 37 can be attached directly thereto without the necessity of providing elbow or coupling pipes as heretofore necessary. The provision of the outlet 130 in this position on the meter bar 32 provides for a compact installation of the meter at its point of use as well as providing for a less costly installation due to the reduction of use of elbows and coupling pipes.

Above the bore section 124, the body 120 is reduced to form a downwardly facing shoulder 132 and is provided with a by-pass port 134 normally closed by a detachable closure in the form of a threaded plug 136 having a socket at its outer end for the reception of an Allen wrench (not shown). Movable longitudinally in and between the bore sections 124 and 126 is a spool valve member 138 provided with a circumferential groove in which is disposed an O-ring 140 slidingly engageable with the wall of the bore sections 124 and 126 to seal therewith and with the valve member. The valve member 138 has a stem 142 provided with threads engaged with corresponding threads in a reduced upper section 143 of the body bore so that rotation of the stem by an appropriate wrench, e.g., a screwdriver engaged in a kerf 144 in the stem will serve to advance or retract the valve member 138. Preferably, the upper end of the bore in the body 120 is protected by a weather cap 145 secured on the upper end of the body. Below the bore section 126, the body 120 is provided with a lateral purge port 146 normally closed by a detachable closure 147 here shown as being in the form of a threaded plug having an Allen wrench-receivable socket in the outer end. A tubular rollpin 148 may be force fitted into the inner end of the port 146 and project inwardly beyond the wall of the bore section 126 to prevent movement of the valve 138 below the bore section 126. The pin 148 also restricts the purge port 146 for reasons later described. In its uppermost position the valve 138 engages with the shoulder 132 to prevent movement upwardly past the by-pass port 134.

From the foregoing construction it will be seen that the valve member 138 is movable between three positions, an upper position, shown in FIGURE 3, wherein it will block off flow between the by-pass port 134 and the lateral outlet 130, an intermediate position in the bore section 128 wherein flow can take place from both the inlet 122 and the by-pass port 134 to the lateral outlet 130, and a lower position in the bore section 126 wherein flow from the inlet 122 to the lateral outlet 130 is blocked.

Referring now to FIGURES 2 and 7 of the drawings, it will be noted that the by-pass meter setting of the present invention is provided with a flexible by-pass line 150 having a first fitting 152 at one end thereof and connected with the by-pass port 70 and a second fitting 154 for connection with the by-pass port 134 in the outlet fitting 38. Additionally, the by-pass line 150 is provided with a valve or stop 157 having a bleed 158 therein. The valve or stop 158 can be of the type shown in the aforementioned Mueller Patent No. 2,653,791 and provided with a closed position wherein flow of the fluid therethrough can be positively stopped and an open position wherein flow of fluid can flow through the by-pass line, and an intermediate position where flow of fluid can be bled from the by-pass line upstream of the valve 157.

Referring now specifically to FIGURES 2 and 5, the first or inlet fitting 152 of the by-pass line 150 is provided with a bore 159 having an enlarged counterbore 161 therein. The counterbore 161 is provided with an outwardly facing shoulder 171 and has pressfitted therein a spider-like fitting 173 having bores 174 therethrough. The spider-like fitting 173 has a centrally positioned and outwardly extending pin-like element 175 thereon which is adapted to engage and positively unseat the ball type valve member 81 from the valve seat 75 when the line 150 is connected to the port.

The by-pass line 150 is provided with a pressure regulator 156 similar to the pressure regulator for the supply line 40. In other words, if the supply line 40 is connected to a source of supply under high pressure the pressure must be reduced prior to entering the house, then regulators 50 and 156 will be needed.

Referring now to FIGURE 1 of the drawings in order to use the installation for by-passing purposes, with the meter stop 46 in its open position, the plug 74 (FIGURE 7) closing the by-pass passageway 72 is removed. As soon as the plug 74 is removed, there will be a surge of fluid past the ball valve member 81 causing the ball valve member to move outwardly against its seat 75 so that there can be no further escape of fluid therethrough. Then the by-pass line 150 is connected to the passageway 72 and as it is threaded into the passageway, the pin-like element 175 in the end thereof will lift the ball like valve element 81 off of its seat 75. Of course, the valve 157 will be in a closed position so that there cannot be escape of fluid out of either the bleed 158 or the fitting 154. The fitting 154 is then connected to the by-pass port 134 after the plug 136 has been removed. The spool valve 138 at this time will be in the position shown in FIGURES 3 and 4 so that there will be no interruption of flow to the house through the meter 20. When the by-pass line 150 has been connected respectively to the stop 46 and the outlet fitting 38, then the valve 157 is moved to a position where the bleed 158 is open so that the incoming gas from the by-pass passageway 72 purges the line 150 of the air.

Once the air has been purged from the line 150, the valve 157 is then opened to allow the gas pressure of the supply line 40 to build up in the by-pass line 150 up to the fitting 38. The valve member 138 in the outlet fitting 38 is then removed to its lowermost position wherein flow of gas can then pass through the fitting only from the by-pass line 150 to the pipe 42 and flow from the meter 20 to the pipe 42 is blocked. Thereafter the meter stop 46 is returned to its closed position to block all flow to the meter 20 and direct all flow of gas to the dwelling through the by-pass line 150. When the system is in this position, the meter unions 26 can be unscrewed and the meter 20 detached for replacement or repair.

It will be noted that the foregoing procedure serves to by-pass the gas around the meter 20 without any surges in or interruption of the flow of gas to the dwelling so that there is no possibility of extinguishing pilot lights, and thus creating a potentially dangerous situation.

After the meter 20 has been repaired and it, or a new meter, has been reconnected to the meter bar 32, service is re-established by following a substantially reverse procedure. First of all, the closure plug 147 for the purge port 146 in the fitting 38 is removed and the meter stop 46 turned to its open position so that gas will flow through the meter up to the spool valve 138 and out of the port 146. Gas is allowed to flow in this manner until the line 40 and the meter have been completely purged of air. This usually can be determined by watching the dials on the meter 20 since the volumetric capacity thereof is normally known. While the meter is being purged gas will still be flowing through the by-pass line 150 into the service pipe 42. As mentioned above, the purge port 147 in the fitting 38 is provided with a restriction 148, such restriction preventing an excessive loss of pressure in the by-pass line which might extinguish the pilot light during the purging operation. After the meter 20 has been completely purged, then the closure plug 147 is re-inserted into the purge port 146 and tightened. The valve member 138 is then moved to its upper position to permit gas to flow only through the meter 20 to the pipe 42.

Once gas flow has been re-established through the meter 20 as described above, then the by-pass line 150 is removed from the passage 72 and from the port 134. It will be appreciated that as soon as the fitting 152 has been removed from the by-pass passage 72, the ball type valve element 83 will immediately seat on the valve seat 75 to prevent a loss of pressure in line 40. Once the by-pass line 150 has been removed, the plugs 74 and 136 are re-installed and the system is in complete operating condition.

It will thus be seen that the objects of this invention have been fully and effectively accomplished. However, it will be realized that the foregoing specific embodiment has been shown and described only for the purposes of illustrating the principles of this invention and is subject to extensive change without departure from such principles. Therefore, the terminology used throughout the specification is for the purposes of description and not limitation, the scope of the invention being defined in the claims.

What is claimed is:

1. A by-pass type meter setting comprising: a fluid line; a fluid meter detachably connected into said line;

a first valve connected into said line upstream of said meter and having two positions, an open position wherein flow takes place therethrough to said meter and a closed position wherein flow from the upstream side of said line to said meter is blocked; means upstream of said valve including a by-pass port, an excessive flow safety valve in said by-pass port and normally operable to close the by-pass port; a second valve connected to said line downstream of said meter and having a body provided with a by-pass port, said second valve having at least two positions, an open position wherein flow takes place therethrough from said meter and flow from said port is blocked and a by-pass position wherein flow takes place from said port to the downstream side of said line and flow from said meter is blocked; a by-pass line detachably connectable to and between said by-pass ports; and means carried by said by-pass line for positively opening said safety valve when the by-pass line is connected to the port carrying said safety valve.

2. The structure defined in claim 1 wherein said excessive flow safety valve includes a fitting having a passage therethrough with an internal valve seat therein, said fitting being received in said by-pass port, and a valve member normally urged onto said seat by pressure of fluid in said line.

3. The structure defined in claim 1 including a valve in said by-pass line adjacent the end detachably connected to said by-pass port in the body of the second valve, said valve in the by-pass line having two positions, a first position blocking said by-pass line when said by-pass line is connected to said by-pass ports and a second position wherein flow takes place through the by-pass line to and through the second valve to the line downstream of said meter.

4. The structure defined in claim 1 wherein said safety valve includes a tubular fitting having an internal annular valve seat, said fitting being positioned in the by-pass port downstream of said first valve, and a valve member cooperating with said valve seat and normally urged upon the same by the pressure of fluid in said line, and wherein said means carried by said by-pass line for positively opening said safety valve includes a fitting provided in the end of said by-pass line and having a passage therethrough, said fitting having a pin-like element extending from the same and adapted to engage and displace said ball valve member from said valve seat.

5. The structure defined in claim 4 wherein said by-pass port in said means upstream of said first valve is threaded and wherein said tubular fitting and said by-pass line are threadedly received therein.

6. The structure defined in claim 1 wherein said first valve includes a valve body having a circular valve seat therein intersected by diametrically aligned inlet and outlet passageways and a valve plug rotatable in said seat, and having a passageway alignable with said inlet and outlet passageways, and wherein said means upstream of said first valve is integral with the valve body upstream of said valve plug and its by-pass port communicates directly with said inlet passageway.

7. A by-pass type meter setting comprising: a fluid line; a fluid meter detachably connected into said line; a first valve connected into said line upstream of said meter, said valve including a body provided with a circular valve seat intersected by diametrically aligned inlet and outlet passageways, a valve plug rotatable in said seat and having a passageway alignable with said inlet and outlet passageways in a first open position of the valve to permit flow to said meter and said valve plug blocking flow to said meter when the passage therein is out of alignment with said diametrically aligned inlet and outlet passageways; said valve body having a by-pass port therethrough communicating with said inlet passageway upstream of said valve plug; a one-way check valve carried in said by-pass port and normally operable to close the by-pass port; a second valve connected to said line downstream of said meter and having a body provided with a by-pass port, said second valve having at least two positions, an open position wherein flow takes place therethrough from said meter and flow from said port is blocked and a by-pass position wherein flow takes place from said by-pass port to the downstream side of said line and flow from said meter is blocked; a by-pass line detachably connected to and between the by-pass ports in said first and second valves; and means carried by the end of said by-pass line for positively opening said check valve when the by-pass line is connected to the port carrying said safety valve.

8. The structure defined in claim 7 wherein said a one-way check valve includes a fitting having a passage therethrough with an interior valve seat therein, said fitting being carried within the by-pass port, and a valve member normally urged to closed position on said valve seat by fluid pressure in said line.

9. The structure defined in claim 8 wherein said means to open said check valve includes a fitting provided in the end of the by-pass line connected to the by-pass port carrying the check valve, said fitting having a passageway therethrough and an elongated pin-like element extending from the same and adapted to engage and displace the valve member from the valve seat of said check valve when said by-pass line is connected thereto.

10. The structure defined in claim 7 including a meter bar detachably suspending the meter, said meter bar having at one end thereof an integral elbow-type inlet fitting for connecting the upstream side of said line to said meter and at the opposite end thereof the body of said second valve, said body of said second valve being provided with a through bore having an inlet end connected to said meter, a lateral outlet end communicating with said bore between the ends of the same and having an axis extending 90° to the axis of said meter bar for connecting the downstream side of said line, the by-pass port of said second valve communicating with said bore at a location spaced longitudinally from said outlet and on the opposite side thereof from said bore inlet end, said bore having sections of the same uniform diameter on opposite sides of said outlet; a spool valve in said bore sealingly engageable with said bore sections and selectively movable therebetween into said open position and said by-pass position; and stem means on said spool valve threadedly engaged with said bore adjacent and accessible from the end opposite said inlet end.

11. Means for supporting a gas meter of the type having an inlet and an outlet spaced from and extending parallel to each other for connecting the inlet and outlet of the same with a gas supply pipe and a gas service pipe, respectively, the gas service pipe extending perpendicular from a wall, said means comprising: a meter bar having at one end thereof an integral elbow type inlet fitting for connecting the inlet of the meter to the gas supply pipe and at the opposite end thereof an outlet fitting integral therewith, said outlet fitting having a body provided with a through bore having an inlet end, a lateral outlet communicating with said bore between the ends thereof, said lateral outlet being connected to the service pipe and having an axis extending at right angles to the axis of the meter bar and to the axis of the inlet end of said through bore, a by-pass port communicating with said bore at a location spaced longitudinally from said outlet and on the opposite side thereof from said bore inlet end, said bore having sections of the same uniform diameter on opposite sides of said outlet; a closure for said by-pass port detachably engageable with said body; means on said body adjacent said bore inlet end and adjacent said outlet and detachably connecting the same respectively to the outlet of the fluid meter and to the service pipe; a spool valve in said bore sealingly engageable with said bore sections and selectively movable therebetween into an open position to block flow from the said by-pass port and said outlet or a by-pass position to block flow between said bore inlet end and said outlet; and stem means on said valve threadedly engaged with said bore adjacent, in accessible form, the other end thereof.

12. A by-pass type meter setting comprising: a fluid line; a fluid meter detachably connected into said line; a first valve connected into said line upstream of said meter and having two positions, an open position wherein flow takes place therethrough to said meter and a closed position wherein flow from the upstream side of said line to said meter is blocked; means spaced upstream from said valve including a by-pass port, a one way check valve in said by-pass port for preventing fluid from flowing from said by-pass port; a second valve connected to said line downstream of said meter and having a body provided with a by-pass port, said second valve having at least two positions, an open position wherein flow takes place therethrough from said meter and flow from said port is blocked and a by-pass position wherein flow takes place from said port to the downstream side of said line and flow from said meter is blocked; a by-pass line detachably connectable to and between said by-pass ports; and means carried by said by-pass line for positively opening said check valve independent of said first valve when the by-pass line is connected to the port carrying said check valve.

References Cited by the Examiner

UNITED STATES PATENTS

| | | | |
|---|---|---|---|
| 2,476,119 | 7/1949 | Smith | 285—30 |
| 2,579,656 | 12/1951 | Douglas et al. | 137—599.1 X |
| 2,724,968 | 11/1955 | Greene | 73—201 |
| 2,748,800 | 6/1956 | Allen | 73—201 X |
| 3,007,491 | 11/1961 | Evans | 137—599.1 |
| 3,173,295 | 3/1965 | Magleby | 73—201 |

RICHARD C. QUEISSER, *Primary Examiner.*

E. D. GILHOOLY, *Assistant Examiner.*